Patented Dec. 4, 1934

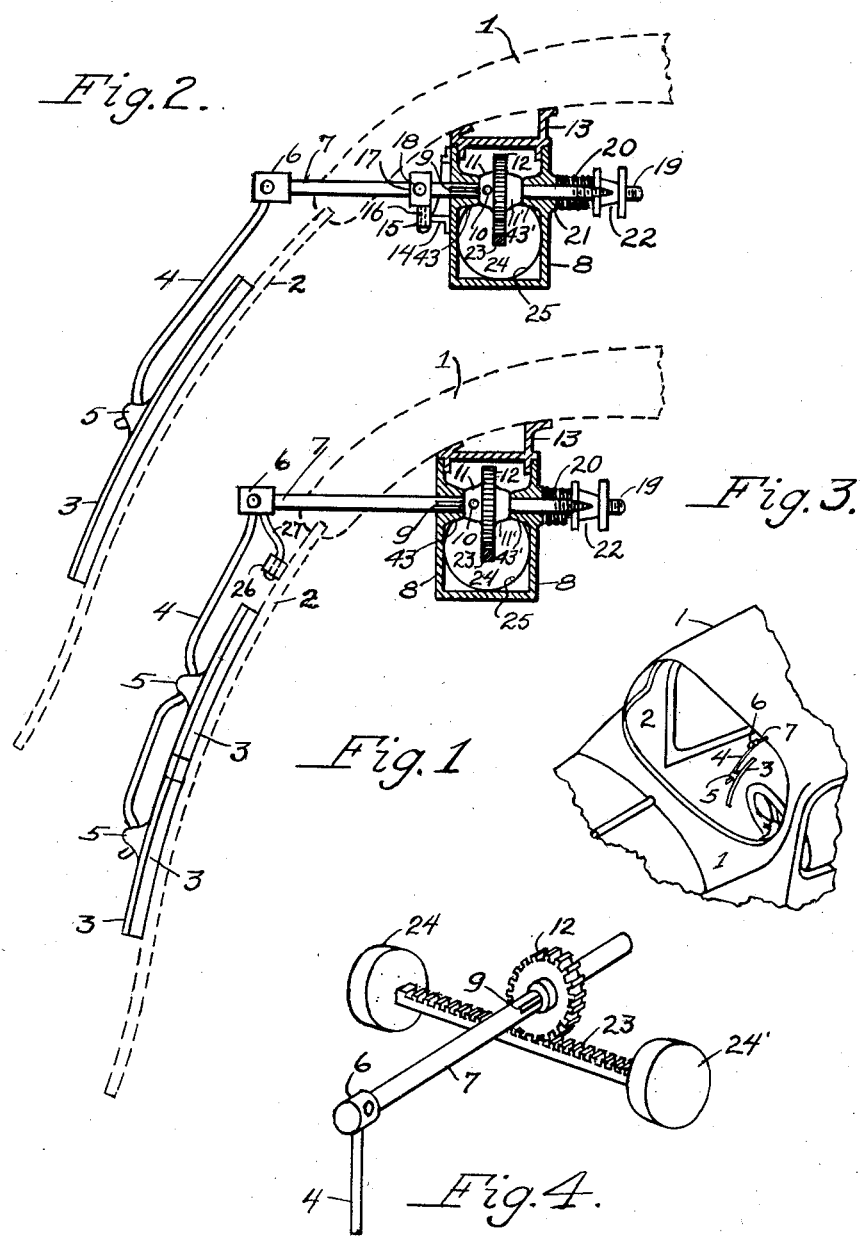

1,982,624

UNITED STATES PATENT OFFICE 1,982,624

WINDSHIELD CLEANER

George A. Barker, Rochester, N. Y.

Application June 29, 1932, Serial No. 620,048

11 Claims. (Cl. 15—255)

(Granted under the act of March 3, 1883, as amended April 30, 1928; 370 O. G. 757)

This invention described herein may be manufactured and used by or for the Government for governmental purposes, without the payment to me of any royalty thereon.

This invention relates in general to a windshield cleaner, but more particularly to a type constructed for cleaning the surface of a curved windshield.

The object of this invention is to provide a windshield cleaning apparatus to be used with a curved surface windshield, in which the wiper blade, during its oscillatory motion, will follow the contour of the surface of the windshield and remain in contact therewith.

Another object of the invention is to provide a windshield cleaner of the type stated which will be simple in construction and operation, and easy to adjust to the surface of the windshield.

Heretofore the wiper blades of windshield cleaners have been constructed to move over a straight surface perpendicular to the axis of the oscillating wiper shaft. With this type of wiper it is only necessary for the motor to impart an oscillatory movement to the wiper blade. However, with a conical windshield, or one of the spherical type, such as described in my copending application Serial No. 605,087, filed April 13, 1932, it is necessary to provide a mechanism which imparts a compound oscillatory and reciprocatory motion to the wiper blade so that it follows the contour of the windshield. In the case of the spherical windshield it will also be necessary that the wiper blade be curved.

The simple mechanism devised to impart simultaneous oscillatory and reciprocatory motion to the wiper arm, the curved edge of the wiper blade, and various other features of novelty which characterize my invention, will hereinafter be pointed out with particularity in the claims, but for a full understanding of my invention, reference may be had to the following detailed description taken in connection with the accompanying drawing, wherein:

Fig. 1 shows a perspective view of the upper front portion of a car body with a curved surface windshield, and equipped with a curved windshield cleaner of the type which forms the subject matter of this invention;

Fig. 2 is a partially sectionized side elevation of an oscillating windshield cleaner equipped with a vacuum motor. This illustration also shows the control cam and adjustable retracting device which effects reciprocation of the oscillating wiper shaft;

Fig. 3 is a similar view to that of Fig. 2 showing a modified form of the windshield cleaner in which a roller, in contact with the windshield, replaces the control cam. In this illustration the wiper blade is shown as made up of several sections, which may be mounted on a flexible arm;

Fig. 4 is a perspective view of a portion of the operating mechanism of the motor showing the pistons, the rack and pinion, and the oscillating and reciprocating shaft.

In Fig. 1 the numeral (1) designates a portion of the car body, (2) a curved windshield, (3) the blade constituting the windshield wiper, (4) the wiper arm, (5) the blade retaining member, (6) the wiper arm retaining member and (7) the motor shaft of the improved windshield cleaner.

The continuation of the shaft (7) into the motor housing (8) is shown in Fig. 2. In this view it will be noted that the shaft (7) is slotted at (9) to receive the screw or pin (10), projecting through the hub (11) of the gear (12), which is rotatably and slidably mounted on said shaft (7). Constructing the shaft in the manner stated permits it to have an oscillating movement corresponding to that of the gear (12) with a simultaneous reciprocating movement in the direction of the axis.

In Figs. 2 and 3 the numeral (13) designates the supporting bracket and cover of the motor housing. Laterally placed within this housing (8) and projecting inwardly from the walls thereof are the two shafts supporting bearings 43 and 43'. These bearings 43 and 43' abut the hubs (11) and (11') of the gear (12) which oscillates between them. On the outer surface of the forward wall of the motor housing illustrated in Fig. 2 is rigidly attached a cam (14) cooperating with a cam roller (15) rotatably mounted on the pin (16) projecting from the collar (17), which is rigidly attached to shaft (7) by means of a screw (18). The rearward portion of the shaft is threaded at (19) and surrounded by a coil spring (20) which bears against a boss (21) projecting from the rear of the housing (8), said spring being held under variable tension by the split nut (22).

It will be seen from this illustration that the spring (20) abutting the boss (21) and pressing against the split nut (22) moves the shaft axially so that the cam roller (15) is always pressed against the surface of the cam.

The gear (12) is oscillated by the rack (23) through the reciprocating movement of the pistons (24) and (24') within the cylinders, one of which (25) is shown in Figs. 2 and 3. This is more clearly illustrated in Fig. 4 which shows the gear (12) in mesh with the reciprocating rack (23). Thus as the gear (12) oscillates or rocks the shaft (7) the cam roller following the contour of the cam surface, will produce a simultaneous reciprocating motion of the motor shaft with the oscillating motion thereof caused by the reciprocation of the pistons. This reciprocating motion will effect an even contact pressure of the wiper blade over the curved surface of the windshield as the same oscillates back and forth thereon.

In Fig. 3 a mechanism is shown which is very similar to that of Fig. 2, except that in this modified form, the cam (14) and cam roller (15) are omitted and a roller (26) is mounted on an arm (27) which is rigidly attached to the wiper arm retaining member (6). This roller (26) is so positioned that it will roll over the surface of the windshield as the wiper blade (3) is oscillated by the motor shaft, and thus produce a reciprocating movement of the shaft (7) similar to that produced by the cam and cam roller in the construction shown in Fig. 2. This effects the movement of the wiper blade or blades over the surface of the windshield in such a manner that they will follow the contour thereof.

In the modification shown in Fig. 3 it will be noted that the spring (20) and split nut (22) are retained to retract the shaft (7) and thus effect constant contact of the roller (26) with the windshield (2). In the modified form shown in this figure the wiper blade is made up of short curved sections instead of a long single blade. This construction is resorted to so as to effect better contact with the curved surface of the windshield.

It is to be understood that the forms of the invention herewith shown and described are to be taken as preferred examples of the same and that various changes in the shape, size and arrangement of parts may be resorted to without departing from the spirit of the invention or the scope of the subjoined claims.

Having described my invention, what I claim as new and wish to secure by Letters Patent is:

1. In a cleaner for curved windshields, a motor, a slidable shaft oscillated by said motor, a wiper blade carried by said shaft, and means for imparting a longitudinal reciprocatory motion to said wiper blade simultaneous with said oscillatory motion, said means including a cooperative cam and follower, one of which is stationary and the other carried by and movable with said shaft, the came so shaped as to produce the reciprocatory movement of said blade in accord with the curvature of said windshield.

2. A cleaner for curved windshields comprising a motor, a gear oscillated by said motor, a shaft slidably keyed within the hub of said gear and capable of oscillatory movement therewith, and means including a fixed cam and a follower, said follower fixedly carried by said shaft and in contact with said cam, said cam so shaped as to produce a longitudinal reciprocating movement of said shaft simultaneously with its oscillation and in accord with the curvature of the windshield to be wiped.

3. A cleaner for curved windshields comprising a motor, a longitudinally slidable rock shaft actuated by said motor, a wiper arm attached to said shaft, a plurality of wiper blades fitting the curvature of the windshield to be wiped and mounted on said wiper arm, and means for imparting a longitudinal reciprocating motion to said shaft simultaneously with its oscillation and in accord with the curvature of said windshield, said means including a roller attached to said shaft and a spring exerting a pressure upon said shaft for maintaining said roller in contact with the surface of the windshield.

4. In a cleaner for a windshield having an irregular surface, a motor, a longitudinally reciprocable shaft oscillated by said motor, a wiper carried by said shaft, and means to maintain said wiper in contact with the windshield, said means including a cam and follower, one of which is fixed and the other of which is carried by said shaft, said cam shaped in accordance with the windshield surface to be cleaned, said means further including a spring exerting a pressure axially upon said shaft for maintaining contact between said cam and follower whereby the oscillatory and reciprocatory motion of said shaft is imparted to said wiper in compensation for the irregularities of said surface.

5. In a cleaner for a windshield having an irregular surface, a motor, a longitudinally slidable shaft oscillated by said motor, a wiper carried by said shaft, and means to maintain said wiper in constant contact with the windshield during the movements of said shaft, said means including a fixed cam and a follower, said follower fixedly carried by said shaft, said cam shaped in accordance with the windshield surface to be cleaned, said means further including a spring disposed about one end of said shaft and adapted to exert an axial pressure tending to cause sliding movement of said shaft for maintaining contact between said cam and follower whereby the oscillatory and longitudinal reciprocatory motion of said shaft is imparted to said wiper in compensation for the irregularities of said surface.

6. A cleaner for curved windshields comprising a wiper actuating shaft and means for oscillating the same, said shaft longitudinally slidable; and means including a fixed cam and a follower to produce a longitudinal reciprocating movement of said shaft simultaneously with its oscillation, said cam so shaped as to produce said movement in accord with the curvature of the windshield to be wiped, said follower fixedly carried by said shaft and in contact with said cam.

7. A cleaner for curved windshields comprising a wiper actuating shaft and means for oscillating the same, said shaft longitudinally slidable; and means including a cooperative cam and follower, one of which is fixed and the other of which is movable with said shaft, to produce a longitudinal reciprocating movement of said shaft simultaneously with its oscillation, said cam so shaped as to produce said first movement in accord with the curvature of the windshield to be wiped.

8. A cleaner for curved windshields comprising a wiper carried by a shaft pivotally mounted adjacent the windshield, the pivot axis being at an angle to the windshield for moving the wiper in a plane tangent to the windshield, and means for moving the shaft longitudinally of its axis to effect movement of said wiper in a plane substantially perpendicular to the tangent plane, said means including an element fixed relative to the windshield and a second element connected to and movable with the shaft and cooperating with said first named element, both of said elements being so constructed and arranged as to produce movement of the wiper in said last mentioned plane in accordance with the curvature of the windshield, when the wiper is moved in the first mentioned plane.

9. A cleaner for curved windshields comprising a wiper carried by a slidable shaft pivotally mounted adjacent the windshield, the pivot axis being at an angle to the windshield for moving the wiper in a plane tangent to the windshield, and means for moving said wiper in a plane substantially perpendicular to the tangent plane, said means comprising a cooperating cam and follower, one of which is fixed and the other connected to the shaft, said cam shaped in accordance with the curvature of the windshield to produce a movement of the wiper in said last mentioned plane in accordance with the curvature of the windshield when the wiper is moved in the first mentioned plane.

10. A cleaner for curved windshields comprising a wiper carried by a slidable shaft pivotally mounted adjacent the windshield, the pivot axis being at an angle to the windshield for moving the wiper in a plane tangent to the windshield, and means for moving said wiper in a plane substantially perpendicular to the tangent plane, said means comprising a motion transmitting connection between a point fixed relative to the windshield and the wiper, said connection being so constructed and arranged as to produce a movement of the wiper in said last mentioned plane in accordance with the curvature of the windshield when the wiper is moved in the first mentioned plane.

11. In a cleaner for a windshield having an irregular surface, the combination of a prime mover and a slidable shaft actuated thereby; a wiper blade attached to said shaft and movable therewith, and means to translate the movement of said prime mover into a combined oscillation of said blade with simultaneous bodily movement of the blade in a direction transverse to that of its oscillation, said means including a cam shaped in accordance with the windshield surface to be cleaned and fixed in relation to said prime mover for maintaining contact between said blade and said surface, and a shaft carried cam follower coacting with said blade and maintained in cooperative contact with said cam.

GEORGE A. BARKER.